United States Patent
Baudouin et al.

(10) Patent No.: US 8,337,981 B2
(45) Date of Patent: Dec. 25, 2012

(54) TRIM ELEMENT

(75) Inventors: Ivan Baudouin, Aulnay Sous Bois (FR); Stéphane Beaupere, Bornel (FR); Eric Dervout, Neuilly en Thelle (FR); François Vaupre, Neaufles-Saint Martin (FR)

(73) Assignee: Faurecia Interieur Industrie, Nanterre (FR)

( * ) Notice: Subject to any disclaimer, the term of this patent is extended or adjusted under 35 U.S.C. 154(b) by 437 days.

(21) Appl. No.: 12/096,434

(22) PCT Filed: Dec. 4, 2006

(86) PCT No.: PCT/FR2006/002639
§ 371 (c)(1),
(2), (4) Date: Sep. 29, 2008

(87) PCT Pub. No.: WO2007/065990
PCT Pub. Date: Jun. 14, 2007

(65) Prior Publication Data
US 2009/0252930 A1  Oct. 8, 2009

(30) Foreign Application Priority Data
Dec. 6, 2005 (FR) ...................................... 05 12363

(51) Int. Cl.
*B32B 5/20* (2006.01)
*B60R 13/02* (2006.01)
*B29C 67/20* (2006.01)

(52) U.S. Cl. ...................... 428/309.9; 428/131; 428/192; 296/39.1; 280/728.3; 264/46.4; 264/163

(58) Field of Classification Search .................. 428/192, 428/131, 319.3, 319, 7, 319.9, 309.9; 296/39.1; 280/728.3; 264/46.4, 163
See application file for complete search history.

(56) References Cited

U.S. PATENT DOCUMENTS
5,863,062 A *  1/1999  Harada et al. .............. 280/728.3
7,208,213 B1 *  4/2007  Ulmer .............................. 428/43
2002/0063417 A1 *  5/2002  Merrifield et al. ............ 280/732

FOREIGN PATENT DOCUMENTS
DE   298 21 409 U1    3/1999
WO       01/23221 A1    4/2001
WO   WO 0123221 A1 *  4/2001

* cited by examiner

*Primary Examiner* — Hai Vo
(74) *Attorney, Agent, or Firm* — Young & Thompson

(57) ABSTRACT

The invention relates to a trim element. It relates to a trim element having a visible side (12) formed of a skin (10), the element comprising a skin (10) laid on a plastic foam (24) bonded to the skin by a continuous bonding layer (26) formed spontaneously at the skin-foam interface during the foaming operation, the skin (10) having a preferential rupture initiator comprising at least one scored feature. Throughout the region in which the scored feature lays, the bonding layer (26) is in contact only with the skin (10) and the foam (24), and, at the scored feature and in the direction of the thickness of the skin, the bonding layer (26) is laid over the opening with a thickness very much smaller than the depth of the scored feature. Application to the interior trim of motor vehicles.

8 Claims, 2 Drawing Sheets

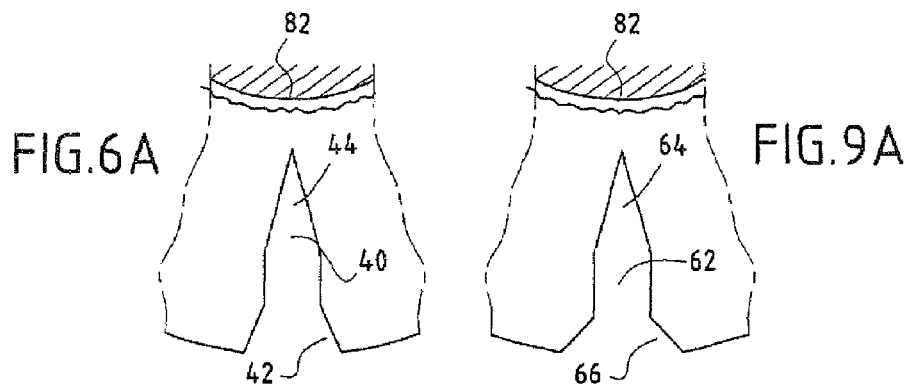
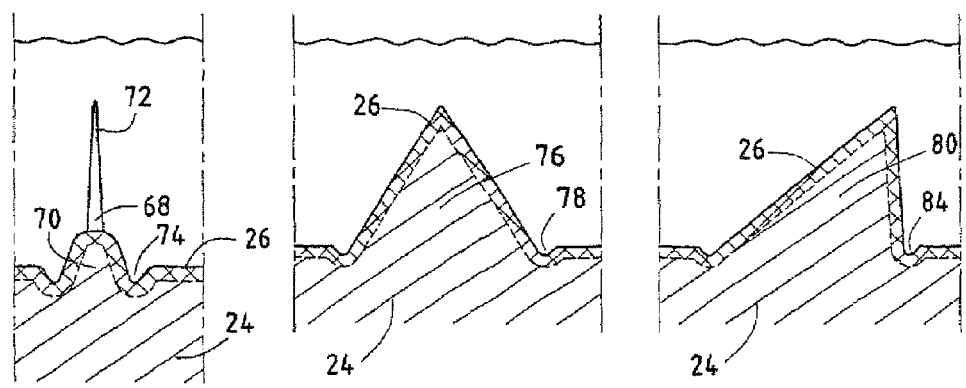
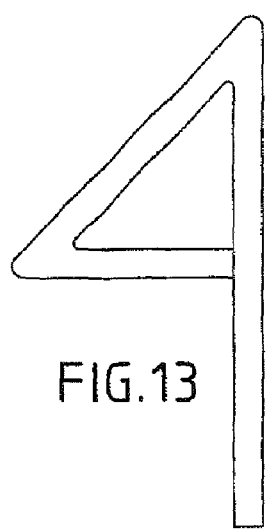

TRIM ELEMENT

The invention relates to a trim component, substantially for the interior trim of a motor vehicle, having a visible face which is formed by a skin which is arranged on a layer of plastics material foam, and a device which is intended to form the notches in the skin for a trim component and a method for producing a trim component.

Such trim components are used in order to form a specific number of surfaces, and in particular surfaces below which airbags are concealed. In this application, it is commonplace to delimit, in the skin of the component covering the airbag, a notch which delimits a portion which is intended to separate, the skin tearing along the length of the notch when the airbag is operated.

It has been found that, in this application, a given number of tear faults were observed along the notch. These faults were attributed to the fact that, when the trim component is formed by means of foaming a plastics material in contact with the skin, the plastics material penetrates into the notch and forms a practically continuous bridge over at least a significant portion of the depth of the notch. The notch therefore loses its functionality, since the connection provided by the plastics material between the two sides of the notch may be stronger the one which the material of the skin itself would provide without a notch.

Attempts have therefore been made to overcome this problem and it has thus been proposed, in document DE-298 21 409, to close the opening of the notch, at the side of the foam, by applying a "protective lacquer" which is intended to form a bridge on the notch and thus prevent the plastics material of the foam from penetrating into the notch.

This method has the disadvantage of requiring a specific operation for forming a bridge on the opening of the notch, in a specific operation which is additional to the other production steps. Furthermore, the component obtained must have a closure bridge which both has a low level of strength so as not to impede the tearing of the skin when an airbag is operated and is also sufficiently strong to withstand the various handling operations between the production thereof and the foaming operation inside a mould.

The object of the invention is to solve the above-mentioned problem in a manner which requires no additional production operation and therefore no increase in cost.

More precisely, according to the invention, the notch is provided with a configuration which prevents the formation of a bridge of extended thickness between the two sides of the notch. In a first shape, the configuration of the notch delimits an opening which is so narrow that, taking into account the wetting and surface tension properties of the skin and the plastics material used to shape the foam, the fluid plastics material practically does not penetrate into the notch. In a second shaper the notch is open to such a wide extent that the plastics material penetrates and the plastics material foam with a low level of strength is what fills the space of the notch and practically does not reduce the suitability of the notch for forming a preferred breaking zone.

More precisely, the invention relates to a trim component which has a visible face which is formed by a skin, the component being of the type comprising a skin which is arranged on a foam of plastics material, the foam being connected to the skin by means of a continuous connection layer which is formed spontaneously at the skin/foam interface during the operation for foaming the fluid plastics material in contact with the skin, the skin having a preferential breakage device which comprises at least one notch which opens via an opening at the side opposite the visible face; according to the invention, practically in the whole of the zone in which the notch is located, the connection layer is in contact only with the skin and the foam and, in the region of the notch and in the direction of the thickness of the skin, the connection layer is arranged on the opening with a thickness which is very much less than the depth of the notch.

In a first embodiment, the opening of the notch at the face of the skin has a width which is at the most in the order of magnitude of the thickness of the connection layer. In this instance, the expression "order of magnitude" indicates a variation of between approximately 0.2 and 5 times, the width of the notch still remaining very much smaller than the depth of the notch.

In one example, the notch has its smallest width practically at the opening or in the region of the opening, so that the plastics material practically does not penetrate into the notch. In another example, one side of the opening of the notch carries a blocking member which covers the opening. In another example, in the portion adjacent to the opening, the notch has a smaller width than at a location which is further away from the opening of the notch. In another example, the notch has a sinuous shape in cross-section. In another example, the notch is inclined in cross-section relative to the face opposite the visible face.

In a second embodiment, the opening of the notch at the face of the skin is sufficiently wide for the plastics material to penetrate and form a foam inside the notch, the connection layer following the inner surface of the notch as far as a location remote from the surface of the skin. In one example, in the region of the opening, the notch has, in cross-section, a V-shape having an angle greater than 45°.

In a third embodiment, which combines the first two, the notch comprises, from the opening, a very wide opening portion which allows the penetration of the plastics material, then a deeper and narrower portion into which the plastics material practically does not penetrate.

In one example, the edges of the opening have a projection.

The invention also relates to a device which is intended to form the notches in the skin of a component according to the above paragraphs, comprising a robot arm and a blade, in which the blade has a cross-section which is adapted to the cross-section of a notch to be formed, the robot arm moving the blade along a notch to be formed. In one example, the device further comprises a mould for supporting the skin which is locally rounded at locations provided for the notch.

The invention also relates to a method for producing a trim component according to the above paragraphs, in which a step for producing the skin involves arranging the skin on a mould which has a projection along the path desired for the notch, and cutting the notch by moving a cutter which has a cross-section which is adapted to the cross-section of the notch to be produced, then separating the skin and the mould.

Other features and advantages of the invention will be better understood from a reading of the following description, given with reference to the appended drawings, in which:

FIGS. 7, 8, 9 and 10 illustrate notches in examples combining two forms of the invention;

FIGS. 11 and 12 are sections illustrating notches in other examples of the invention corresponding to the second embodiment of the invention; and FIG. 13 is an example of a cutter which is used to form the notch of the embodiment of FIG. 12.

Figure 1:
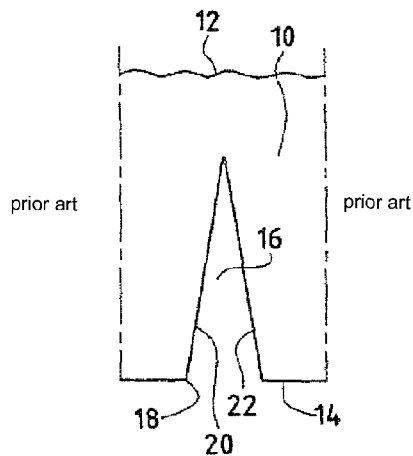
FIG. 1 is a cross-section through a notch formed in a skin in accordance with the conventional method.
Figure 2:
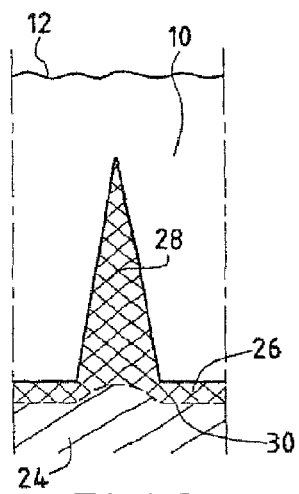
FIG. 2 is a section through a portion of a trim component formed with the skin illustrated in FIG. 1 and illustrating the manifestation of the problem solved by the invention.

FIG. 1 is a cross-section through a skin at the location of a notch. More precisely, a skin 10 having a visible face 12, having, for example, a grain, also has an inner face 14 on which a notch 16 opens via an opening 18. The notch has a V-shape which is delimited by two sides 20 and 22.

When an interior trim component is produced with this skin which delimits one side of a moulding cavity, a plastics material which is intended to form a foam is introduced at the side of the inner face 14 of the skin 10. Since the opening 18 of the notch is relatively large, the fluid plastics material can easily penetrate practically as far as the base of the notch. When the foaming operation is complete, the interface between the foam 24 which is normally flexible, and the inner surface 14 of the skin comprises a connection layer 26 which practically forms no foam and which constitutes a type of continuous film which is practically in constant contact with the inner surface 14 of the skin. However, the plastics material which has been able to penetrate into the notch 16 prior to the foaming operation forms a portion 28 which comprises only a small number of cavities and which constitutes a type of adhesive bridge over practically the entire depth of the notch. Whilst the foam has a low level of tear-resistance owing to the porosity thereof, the plastics material with a small number of cavities in contrast has a high level of tear-resistance.

Even if the plastics material does not penetrate into the entire depth of the notch but instead only over a third or a half, it forms a bridge which is sufficiently strong for the notch, after polymerisation and cooling, not to have a level of strength which is very much less than that of the skin itself which surrounds it. The notch therefore no longer necessarily constitutes a preferred breaking device owing to this connection between the two sides 20, 22 of the notch.

The solution to this problem is to prevent the plastics foaming material from penetrating into the notch, as suggested by the above-mentioned document of the prior art.

It is possible to envisage the use of a very thin aperture but it is not easy to simply reduce the width of the notch. The notch is normally produced by means of pressure and it is not possible to produce notches of very small width since the blades used must be so thin that they have no durability.

According to the invention, in order to prevent the fluid plastics material from penetrating into the notch, the notch is provided with such a configuration that the connection layer formed by the plastics material may only form, between the two sides of the notch, a bridge which is very thin and which therefore has a low level of strength. This bridge may be located either close to the inner face of the skin, in the region of the opening, or at the base of the notch, or in an intermediate position.

In the embodiments of FIGS. 3, 4, 5 and 6, the bridge formed by the connection layer is close to the inner surface of the skin. In the embodiments of FIGS. 11 and 12, the bridge formed by the connection layer is located at the base of the notch. In the embodiments of FIGS. 7, 8, 9 and 10, this bridge is located in an intermediate position.

FIGS. 3 to 6 illustrate embodiments in which the opening of the aperture at the inner surface 14 is very small, so that the connection layer 26 practically does not penetrate into the notch which remains empty.

Figure 3:
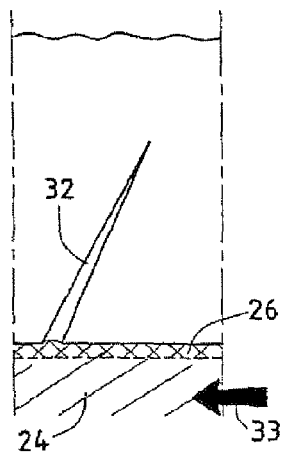
FIGS. 3, 4, 5 and 6 illustrate four examples of the invention in the first embodiment thereof.

In the embodiment of FIG. 3, the notch is very fine so that the opening thereof is very small and it is inclined in a direction opposed to the flow direction 33 of the plastics material which is injected in order to form the foam layer. In this manner, the fluid plastics material does not have a tendency to penetrate into the notch 32.

Figure 4:
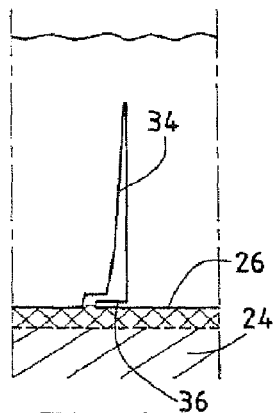

In the embodiment of FIG. 4, the notch 34 has a bent shape so that it delimits, in the region of the opening, a blocking member 36 which practically closes the opening so that the fluid plastics material which forms the connection layer 26 cannot penetrate into the notch.

Figure 5:
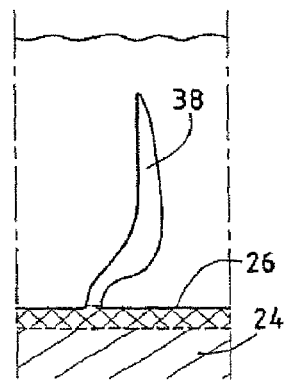

In the embodiment of FIG. 5, the notch 38 has a sinuous shape and a small opening so that the fluid plastics material which forms the connection layer 26 terminates at the opening. If the plastics material had a tendency to penetrate locally into the notch 38, the sinuous shape would reduce the penetration thereof.

Figure 6:
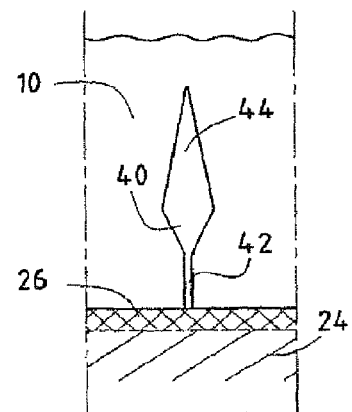

FIG. 6 illustrates an embodiment in which the notch 40 has, at the side of the inner face, a very small opening which is formed by a notch portion 42 which prevents the fluid plastics material of the connection layer 26 from entering. However, towards the inner side of the skin, the notch has a wider portion 44 which may increase the breaking properties.

FIGS. 11 and 12 illustrate the second form of the invention. In these Figures, the notch is open so wide that the fluid plastics material is able to penetrate as far as the base, forming a thin connection layer 26 on the walls of the notch. The width of the notch is such that the plastics material forms foam almost as far as the base of the notch. As a consequence, the bridge formed between the two walls of the notch by the connection layer 26 exists only at the base and has a small thickness. This bridge therefore has only a low level of resistance to breaking.

In the embodiment of FIG. 11, the notch 76 is symmetrical and, in the embodiment of FIG. 12, the notch 80 is asymmetrical so that one side of the notch 80 is practically perpendicular relative to the skin and the other is greatly inclined, for example, through an angle of 45°. The effect obtained during a breakage may thus be asymmetrical and promote the separation of the portion which must be broken away.

FIGS. 7 to 10 illustrate embodiments in which the two forms of the invention are combined. More precisely, the notches of these embodiments comprise, towards the inner surface 14, a wide portion which has the effect described with reference to the FIGS. 11 and 12 and, towards the base, a narrow portion such that the opening has a small width which provides the phenomenon described with reference to FIGS. 3 to 6.

Figure 7:
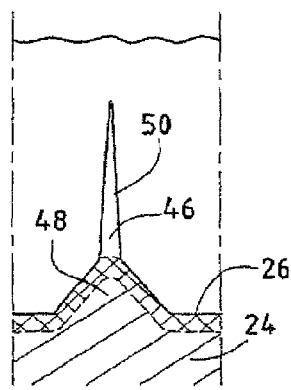

The embodiment of FIG. 7 has a notch 46 which comprises an outer portion 48 which is open to a large extent and whose function is similar to that described with reference to FIG. 11. The narrowest inner portion of this notch portion 48 is connected via a narrow opening to a second narrow notch portion 50. The bridge formed by the connection layer is limited to one narrow portion in the region of the connection between the two portions 48 and 50 of the notch 46.

Figure 8:
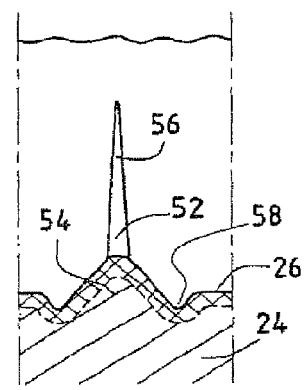

In the embodiment of FIG. 8, there is further indicated the presence of projections 58 around the outer notch portion 54 that is connected to a narrow inner portion 56 in the notch 52. These projections 58 are formed when the tool used to form the notch is of the heating type, so that a flange such as 58 (FIG. 8, 66 (FIG. 9), 74 (FIG. 10), 78 (FIG. 11) is formed around the opening at the inner face.

Figure 9:
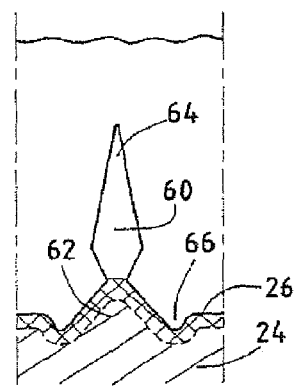

In the embodiment of FIG. 9, the notch 60 has an outer portion 62 which is similar to that of the embodiment of FIG. 8, and an inner portion 64 which widens after a narrow opening, as in the embodiment of FIG. 6.

The embodiment of FIG. 10 is similar to that of FIG. 8 and comprises a notch 68 having a wide portion 70 at the side of the inner surface and a narrow portion 72 at the side of the visible face. Compared with the embodiments of FIGS. 7 to 9, in which the notch portion close to the inner surface 14 has a V-shape in cross-section, the notch portion 70 is distinguished by a bell-like shape which allows the thickness to be reduced for the bridge which is formed at the opening of the inner notch portion 72, compared with the embodiments of FIGS. 7 to 9.

It has been indicated above that the production of an aperture which is very thin as illustrated in FIG. 3 or which has a portion which is locally very thin as indicated in FIGS. 6 and 9 presented problems. The conventional technique used during the production of the skin does not allow such configurations to be readily produced, in particular since the equipment has only a low level of durability.

According to the invention, this problem is resolved owing to a specific method and device.

In this manner, in a method for producing such notch configurations, the notches are not formed by means of pressure or moulding, but instead by means of cutting using cutters of an appropriate shape which are preferably moved by means of a robot.

Of the various embodiments of notches, the notch shapes of FIGS. 6 and 9 are the ones which present the greatest problems in terms of production owing to the variation in the width of the opening towards the base. FIGS. 6A and 9A are diagrams indicating how these notches which are the most difficult to produce are formed.

As indicated in FIGS. 6A and 9A, at the location at which the notch must be produced, the skin is placed on a highly-curved support 82, and a cut-out is produced using a cutter which has a cross-section having a shape which is adapted to that of the notch widened on the mould. In this manner, although the inner portion 44 of the notch is wider than the outer portion 42 in a position for use (FIG. 6), it will be noted in FIG. 6A that, during production, the notch has a width which decreases continuously from the outer side towards the inner side and which can therefore be produced readily with a strong cutting blade. In FIG. 6A, the outer notch portion 42 is intended to form a portion having practically parallel walls (FIG. 6) whilst, in the embodiment of FIG. 9, the outer notch portion 66 is intended to delimit a portion open to a wide extent.

FIG. 13 is a cross-section, by way of example, through a blade which can be used for the cutting formation of the notch 80 illustrated in FIG. 12. This cutting blade, only the tip of which indents the skin, may optionally be heated and, in this instance, it forms a flange as indicated by the reference numeral 84 in FIG. 12.

In this manner, the invention relates to a device which is intended to form notches of the type described, in which a robot moves a blade having a cross-section which is adapted to the cross-section of the notch to be formed, optionally on a skin which is placed on a mould which is locally rounded opposite the notch.

The invention also relates to a method for producing a trim component of the type in question in which the production of the skin involves arranging the skin on a mould which has a projection which follows the path desired for the notch, and cutting the notch using a cutter having a cross-section which is adapted to the cross-section of the notch to be produced, then separating the skin and the mould.

The invention claimed is:

1. A trim component which has a visible face which is formed by a skin, the component comprising:
    a skin which is arranged on a foam of plastics material, the foam being connected to the skin by means of a continuous connection layer which is formed spontaneously at the skin/foam interface during the operation for foaming the fluid plastics material in contact with the skin, the skin having a preferential breakage device which comprises at least one notch which opens via an opening at the side opposite the visible face, wherein, substantially in the whole of the zone in which the notch is located, the connection layer is in contact only with the skin and the foam and, in the region of the notch and in the direction of the thickness of the skin, the connection layer is arranged on the opening with a thickness being less than the depth of the notch,
    wherein the opening of the notch at the face of the skin has a width which is at the most 0.2 and 5 times the thickness of the connection layer,
    the notch has its smallest width at the opening or in the region of the opening, the notch being substantially free of the fluid plastics material penetrating therein.

2. The trim component according to claim 1, wherein, in the portion adjacent to the opening, the notch has a smaller width than at a location which is further away from the opening of the notch.

3. The trim component according to claim 1, wherein the notch has a shape which is selected from a shape which is sinuous in cross-section and a shape which is inclined in cross-section relative to the face opposite the visible face.

4. The trim component according to claim 1, wherein the edges of the opening have a projection.

5. A method for producing a trim component according to claim 1, comprising the steps of:
    arranging the skin on a mould which has a projection which follows the path desired for the notch,
    cutting the notch using a blade having a cross-section corresponding to the cross-section of the notch to be produced,
    separating the skin and the mould,
    forming the foam of plastics material against the skin.

6. The method according to claim 5, comprising the step of heating the blade prior to forming the notch.

7. A trim component which has a visible face which is formed by a skin, the component comprising:
    a skin which is arranged on a foam of plastics material, the foam being connected to the skin by means of a continuous connection layer which is formed spontaneously at the skin/foam interface during the operation for foaming the fluid plastics material in contact with the skin, the skin having a preferential breakage device which comprises at least one notch which opens via an opening at the side opposite the visible face, wherein, substantially in the whole of the zone in which the notch is located, the connection layer is in contact only with the skin and the foam and, in the region of the notch and in the direction of the thickness of the skin, the connection layer is arranged on the opening with a thickness being less than the depth of the notch,
    wherein the notch comprises, from the opening towards the visible face, an outer portion having a first opening angle that opens towards the side opposite the visible face and is filled with the plastics material, an inner portion having a second opening angle that opens towards the side opposite the visible face and being substantially free of penetration by the plastics material, and
    wherein a width at the opening of the first opening angle is sufficiently greater than a width at the opening of the second opening angle for the plastics material to penetrate and form the foam.

8. A trim component which has a visible face which is formed by a skin, the component comprising:
    a skin which is arranged on a foam of plastics material, the foam being connected to the skin by means of a continuous connection layer which is formed spontaneously at the skin/foam interface during the operation for foaming the fluid plastics material in contact with the skin, the skin having a preferential breakage device which comprises at least one notch which opens via an opening at the side opposite the visible face, wherein, substantially in the whole of the zone in which the notch is located, the connection layer is in contact only with the skin and the foam and, in the region of the notch and in the direction of the thickness of the skin, the connection layer is arranged on the opening, wherein the notch comprises, from the opening towards the visible face, an outer portion having a first opening angle that opens towards the side opposite the visible face and is filled with the plastics material, an inner portion having a second opening angle that opens towards the side opposite the visible face and being substantially free of penetration of the plastics material, wherein a width at the opening of the first opening angle is sufficiently greater than a width at the opening of the second opening angle for the plastics material to penetrate and form the foam, and wherein the edges of the opening have a projection being located in the outer portion of the notch.

* * * * *